United States Patent [19]

Barshay et al.

[11] Patent Number: 5,171,518

[45] Date of Patent: Dec. 15, 1992

[54] METHOD OF DETERMINING DIFFERENCES OR CHANGES IN THE RATE OF HEAT TRANSFER THROUGH TUBE WALLS

[75] Inventors: Stephen S. Barshay, West Hartford; Gordon L. Key, Lebanon, both of Conn.

[73] Assignee: Combustion Engineering, Inc., Windsor, Conn.

[21] Appl. No.: 839,380

[22] Filed: Feb. 21, 1992

[51] Int. Cl.$^5$ .......................................... G21C 17/017
[52] U.S. Cl. .................................. 376/247; 376/245; 374/43; 374/44; 165/11.1
[58] Field of Search ................. 376/247, 245; 374/112, 374/43, 44; 165/11.1, 11.2; 138/104

[56] References Cited

U.S. PATENT DOCUMENTS

| | | | |
|---|---|---|---|
| 3,592,060 | 7/1971 | Laverman | 73/15 |
| 4,024,751 | 5/1977 | Potrzebowski | 73/15 R |
| 4,396,300 | 8/1983 | Characklis et al. | 374/43 |
| 4,541,730 | 9/1985 | Comey et al. | 374/43 |
| 4,729,667 | 3/1988 | Blangetti et al. | 374/43 |

*Primary Examiner*—Donald P. Walsh
*Assistant Examiner*—Chrisman D. Carroll
*Attorney, Agent, or Firm*—Chilton, Alix & Van Kirk

[57] ABSTRACT

A method for detecting changes in the rate of heat transfer through a tube wall due to the deposition or removal of deposits formed thereon. The method involves obtaining a segment of tubing, placing a highly conductive material in contact with one of the inner surface and outer surface of the tubing wall, contacting the other of the inner and outer surface of the tubing wall with a heating or cooling medium, and measuring the time required for the temperature of the thermally conductive material to change between two predetermined temperature measurement points. Subsequently, the wall of the tubing segment is cleaned or the tubing segment is replaced with a different tubing segment, and the rate of temperature change of the tube walls is tested again in a similar manner. By comparing the times measured in the first and second trials, the difference in the rate of heat transfer before and after cleaning of the tubing segment can be determined.

19 Claims, 1 Drawing Sheet

METHOD OF DETERMINING DIFFERENCES OR CHANGES IN THE RATE OF HEAT TRANSFER THROUGH TUBE WALLS

BACKGROUND OF THE INVENTION

The invention generally relates to a method for determining rates of heat transfer, and more particularly relates to a method for determining differences or changes in the rate of heat transfer through tube walls.

In nuclear reactor steam generators, a gradual decrease in outlet pressure has been noted. This pressure loss has been attributed in part to fouling on the secondary side of the steam generator heat-transfer tubes. In order to determine whether it would be economically advantageous to remove these deposits from the tube walls, particularly from the outer walls of the tubes, an accurate method is needed to determine the change in the rate of heat transfer through a tube wall before and after it has been cleaned.

It is well known that the rate of heat transfer through the wall of a tube can be determined by pumping hot water through the tube and measuring the quantity of heat that is transferred to a fluid outside the tube. However, this technique requires an expensive calorimeter, and can be both difficult and costly when the tube is radioactively contaminated, as the water that is pumped through the tube is likely to become radioactively contaminated.

Other direct techniques that are known for measuring changes in heat transfer rates do not take into account the specific geometry of a steam generator tube. Removal of deposits from the surface of a tube will reduce the heat transfer area of the tube. For example, the removal of a 10 mil thick deposit from the outer surface of a 0.5 inch OD tube will reduce the outer surface area of the tube by 4%. Therefore, in order to determine the difference in the rate of heat transfer through a tube wall before and after cleaning, it is necessary to consider both the change in the heat transfer coefficient of the tube wall due to the removal of deposits, and any changes in the total heat transfer area of the surface of the tube that would result from the cleaning process.

SUMMARY OF THE INVENTION

An object of the invention is to provide an accurate method for determining changes in the rate of heat transfer through a tube wall that occur when deposits are formed on, or removed from, the inner and/or outer surfaces of the tube wall.

Another object of the invention is to provide an inexpensive method for measuring changes in heat transfer rates through the wall of a heat exchanger tube.

Another object of the invention is to provide a method for determining the differences in heat transfer rates through the walls of two or more different heat exchanger tubes.

Yet another object of the invention is to provide a method for determining differences or changes in the rate of heat transfer through a nuclear reactor steam generator tube wall which does not involve significant problems of radioactive waste disposal.

Other objects will be in part obvious and in part pointed out more in detail hereinafter.

The present invention is a method for determining differences or changes in the heat transfer characteristics of tube walls, such as changes in heat transfer rates due to the removal of deposits which form on inner and/or outer surfaces of the tube wall. According to the method of the invention, a segment of tubing material is selected. An appropriate quantity of a thermally conductive material is supported on one of the inner side and outer side of the tubing segment in thermal contact with the wall. Two temperature measurement points $T_1$ and $T_2$ are chosen, each of which is outside the melting temperature range and vaporization temperature range of the thermally conductive material under the applicable pressure conditions, i.e. the pressure at which measurements are made according to the invention. A heating or cooling medium having an initial temperature $T_a$ is placed on the other of the inner side and outer side of the tubing segment in thermal contact with the wall. The temperature $T_a$ is appropriate to cause the temperature of the thermally conductive material to change from $T_1$ to $T_2$ as a result of heat transfer to or from the medium through the tubing segment wall. While the tubing segment is in thermal contact with both the thermally conductive material and the heating or cooling medium, the time required for the temperature of the thermally conductive material to change from $T_1$ to $T_2$ is determined. The tubing segment is subsequently removed from thermal contact with the heating or cooling medium.

A tubing segment having different heat transfer characteristics than the original tubing segment is then obtained, either by altering the physical and/or heat transfer characteristics of the original tubing segment or by selecting an entirely different tubing segment. If not already present, an appropriate quantity of a thermally conductive material is supported on one of the inner and outer sides of the tubing segment wall in the manner described above. Two temperature measurement points $T_3$ and $T_4$ are chosen, each of which is outside the melting temperature range and vaporization temperature range of the thermally conductive material under the pressure conditions at which measurements are made according to the invention. The temperature measurement points are selected such that $T_3 < T_4$ when $T_1 < T_2$, and $T_3 > T_4$ when $T_1 > T_2$. A heating or cooling medium having a temperature $T_b$ appropriate to cause the temperature of the thermally conductive material to change from $T_3$ to $T_4$ is placed on the other of the inner and outer sides of the tubing segment in thermal contact with the wall. While the tubing segment is in thermal contact with both the thermally conductive material and the heating or cooling medium, the time required for the temperature of the thermally conductive material to change from $T_3$ to $T_4$ is determined. The times required for the temperature of the thermally conductive material to change from $T_1$ to $T_2$ and from $T_3$ to $T_4$ are then compared in order to determine the change in the rate of heat transfer through the wall of the tube as a result of the alteration process, taking into account any differences in $T_1$ and $T_3$, $T_2$ and $T_4$, $T_a$ and $T_b$, and the nature of the mediums used to bring about temperature changes. Furthermore, when two different tubing segments are involved, the sizes and weights of the tubing segments, the weight of thermally conductive material in contact with each tubing segment, the positions of the thermally conductive material and heating or cooling medium relative to the tubing segment wall, and any other experimental variables also are considered.

The method of the invention is particularly useful to determine the beneficial effect of chemically cleaning the outer surface of thin-walled tubing, such as steam generator tubing used in nuclear reactors. In order to obtain particularly accurate results, and to avoid having to normalize one set of data relative to the other, $T_1=T_3$, $T_2=T_4$, $T_a=T_b$, the same type and volume of heating or cooling medium is used for both measurements, and the medium is kept at a generally constant temperature while time measurements are made. The thermally conductive material preferably is on the same side of the tubing segment wall for each time measurement. In an advantageous embodiment, the thermally conductive material has a higher conductivity than the tubing segment. Multiple time measurements preferably are made between $T_1$ and $T_2$ and between $T_3$ and $T_4$ to confirm the accuracy of the results which are obtained. While the method of the invention is particularly useful for determining differences in heat transfer characteristics of tubing material, it also can be applied to walls of other types of structures.

The invention accordingly comprises the several steps and the relation of one or more of such steps with respect to each of the others as described in the following detailed disclosure.

DETAILED DESCRIPTION OF THE INVENTION

Figure 1:
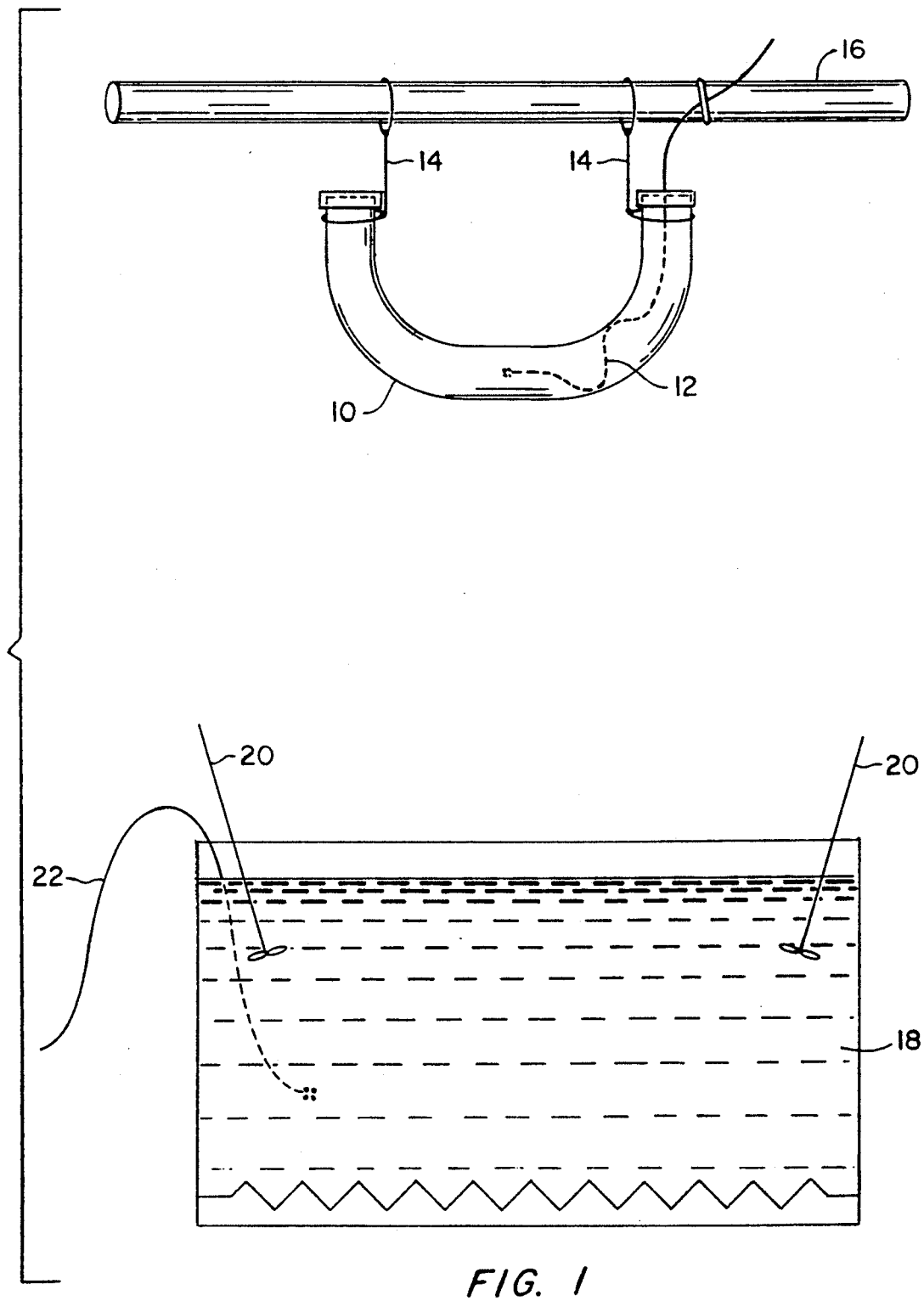
FIG. 1 is a diagrammatic view of a U-shaped tubing segment having a thermocouple mounted therein and a water bath for use in Example 2 of the present invention.

According to the present invention, a segment of tubing having a first conductivity is removed from a heat exchanger. A thermally conductive material is supported on one of the inner side and the outer side of the tubing segment in thermal contact with the tubing segment wall. A thermocouple is placed in contact with a portion of the thermally conductive material which is not close to the tube wall. Temperature measurement points $T_1$ and $T_2$ that are not within the melting temperature range or vaporization temperature range of the thermally conductive material are selected. Preferably, $T_1$ and $T_2$ are selected such that the thermally conductive material is a melt at one of $T_1$ and $T_2$ and a solid at the other of $T_1$ and $T_2$. The tubing segment is brought to an initial temperature $T_i$ that is either higher or lower than both $T_1$ and $T_2$, and is kept at the initial temperature $T_i$ for a measured or known period of time. A heating or cooling medium having a temperture appropriate to bring the temperature of the thermally conductive material to $T_1$, and subsequently to $T_2$, is placed on the other of the inner and outer sides of the tubing segment in thermal contact with the tubing segment wall. Thermal contact includes direct physical contact, as well as indirect contact that is sufficiently close to provide a measurable amount of heat transfer between the substances. Preferably, the thermally conductive material and the heating or cooling medium are in direct physical contact with the tubing segment wall and are directly opposite each other, separated only by the tubing segment wall. While the tubing segment is in thermal contact with both the thermally conductive material and the heating or cooling medium, the time required for the temperature of the portion of the thermally conductive material in contact with the thermocouple to change from $T_1$ to $T_2$ is measured. Optionally, the tubing segment is then removed from contact with the medium after a known amount of time and is placed in contact with another heating or cooling medium having a temperature $T_c$ which will effect a temperature change in the opposite direction, i.e. from $T_5$ to $T_6$. The time required for the thermally conductive material to undergo a temperature change in this direction also can be timed. Time measurements of the heating and/or cooling processes preferably are made repeatedly until consistent, reliable data has been obtained.

A tubing segment having a wall with different physical and/or heat transfer characteristics than the wall of the original tubing segment is then obtained, either by altering the physical and/or heat transfer characteristics of the original tubing segment or by selecting a different tubing segment. If the original tubing segment is altered, the thermally conductive material and thermocouple preferably, although not necessarily, remain in contact with the tubing segment during the alteration process. If a different tubing segment is used, the thermally conductive material is disposed in thermal contact with the wall of the tubing segment in the same manner as for the original tubing segment, and a thermocouple is placed in contact with the thermally conductive material, away from the tube wall. The time required for the thermally conductive material to undergo a predetermined temperature change from $T_3$ to $T_4$ is then measured by contacting the other of the inner and outer wall of the tubing segment, i.e, the wall that is not in contact with the thermally conductive material, with an appropriate heating or cooling medium having a temperature $T_b$ and measuring the time required for the temperature of the thermally conductive material to change from $T_3$ to $T_4$ in the same manner as with the original tubing segment. Measurements optionally can be made of temperature changes in an opposite direction, i.e., from $T_7$ to $T_8$ after placing a medium having a temperature $T_d$ in thermal contact with the tubing segment or the side of the tubing segment opposite to the thermally conductive material. Time measurements preferably are repeated until consistent and reliable data have been obtained. The same temperature measurement points and heating and/or cooling mediums preferably are used before and after alteration of the tubing segment, i.e. $T_a=T_b$, $T_1=T_3$, and $T_2=T_4$, and when applicable, $T_c=T_d$, $T_5=T_7$ and $T_6=T_8$ The tubing segment or segments used according to the method of the invention can be formed from any conductive metal or non-metal tubing material. Because the method of the invention does not require calculations based upon tube geometry, the tubing segment or segments can have any shape, thickness and composition. The invention is particularly useful for comparing the heat transfer characteristics of various types of thin-walled metal tubing useful in and/or removed from nuclear reactor steam generators, such as used and unused or cleaned Inconel 600 (International Nickel Company) tubing.

The thermally conductive material preferably has a -higher conductivity than the tubing segment wall within the temperature ranges $T_1$-$T_2$ and $T_3$-$T_4$ in order that the limiting factor in the rate of temperature change will be the heat transfer coefficient of the wall rather than the heat transfer coefficient of the thermally conductive material. The thermally conductive material preferably melts and crystallizes within narrow temperature ranges between $T_1$ and $T_2$ and between $T_3$ and $T_4$, and has a melting point well below the melting point of the tubing material. For example, low melt metal alloys comprising bismuth and lead and which have melting ranges of less than one degree Fahrenheit are particularly useful. Cerrobend ® (Cerro Metal Products Co.), which contains 50.00% bismuth, 26.70% lead, 13.30% tin and 10.00% cadmium has been used successfully, as it melts in a narrow temperature range well below the melting point of a heat exchanger tube, i.e. at 158° F. The thermally conductive material is conveniently kept at about atmospheric pressure, although the method of the invention can be carried out with the thermally conductive material maintained at another pressure. The thermally conductive material preferably is in the form of a melt when it is placed in contact with the inner or outer wall of the tubing segment. The amount of thermally conductive material that is required will depend in part upon the desired accuracy of the measurements which are made. Preferably, when the thermally conductive material is placed inside the tubing segment, the inner side of the tubing segment is filled almost completely, leaving only a small air space (about 1-5%) to allow for expansion of the thermally conductive material. As a minimum, a sufficient amount of thermally conductive material must be used to ensure that the temperature-sensitive point on the thermocouple is always in contact with only the thermally conductive material and does not contact the tube wall. When the thermally conductive material is placed on the outer side of the tube segment, it is desirable to have a thickness of about 0.25 inch or more along the entire length of the tube.

In order to measure the temperature of the thermally conductive material, a thermocouple is positioned in contact with a portion of the thermally conductive material. The thermocouple should not touch the wall of the tubing segment. When the thermally conductive material is placed inside the tubing segment, a particularly useful way for preventing the thermocouple from touching the tube wall is to place the thermocouple at the end of a wire which is bent in an S-shaped curve. In this manner, the thermocouple can be positioned near the center of the tube, with the curves of the "S" abutting opposite side walls of the tube. Preferably, the thermocouple is positioned as far as possible from the ends of the tube, as heat transfer through the seals on the ends of the tube can therefore be considered negligible.

When the thermally conductive material is placed inside the tubing segment, the tube preferably is sealed in any manner that will prevent leakage into or out of the interior of the tubing segment. Proper sealing of the tubing segment is particularly important for situations in which the inner walls of the tube may have been in contact with radioactive material, as escape of radioactivity into the heating and cooling mediums is thereby prevented. The tubing segment can be sealed with welded caps, locking fittings, or other airtight and watertight means. When the thermally conductive material is positioned outside the tubing segment, it is preferable to place the thermally conductive material in a sealed enclosure which encompasses the outer wall of the tubing segment, as such an arrangement will allow for the thermally conductive material to be melted. However, it also is possible to use a thermally conductive material on the inner or outer side of the tubing segment which remains in a solid phase throughout the measurement process, and under such circumstances a sealed enclosure is not necessarily required, assuming that the thermocouple is in contact with only the thermally conductive material.

In order to bring about temperature changes of the thermally conductive material, heating and/or cooling mediums such as liquid baths are prepared. While a single measurement of the time required for a temperature change between a pair of temperatures $T_1$ and $T_2$ can be made using a single medium having a temperature that is higher or lower than both $T_1$ and $T_2$, it is preferable to have at least two baths, e.g. a first bath at a temperature $T_a$ that is warmer than both $T_1$ and $T_2$ and a second bath at a temperature $T_c$ that is cooler than both $T_1$ and $T_2$. By transferring the tubing segment repeatedly between the first and second baths, temperature increases and/or decreases of the thermally conductive material can be measured repeatedly. Optionally, the warmer bath has a temperature above the melting point of the thermally conductive material and the cooler bath has a temperature below the melting point of the material. Furthermore, the tubing segment preferably is repeatedly transferred from one bath directly to the other bath at a consistent interval of time, e.g. every 5 minutes, in order to ensure that multiple measurements are made under identical conditions. While a variety of types of mediums can be used, including gases and liquids, water and air are preferred for economic reasons. Preferably, the heating and/or cooling baths are the same substance that the tube is in contact with during its normal use, as the amount of improvement in heat transfer rates resulting from tube alteration may depend upon the type of medium that is used. For example, when the surface of the tubing segment has pores, different mediums may enter the pores at different rates, thereby affecting heat transfer rates through the tube wall.

The temperature measurement points $T_1$ and $T_2$ are temperatures at which the slope of the applicable temperature versus time heating or cooling curve for the thermally conductive material is relatively steep. For example, $T_1$ and $T_2$ preferably are points of maximum slope on a temperature versus time heating curve for the thermally conductive material when $T_1 < T_2$ $T_1$ and $T_2$ preferably are points of maximum negative slope on a temperature versus time cooling curve for the thermally conductive material when $T_1 > T_2$. When a conventional thermocouple is used, the thermally conductive material preferably will have a rate of temperature change of at least about 2-3 degrees per minute at the temperature measurement points, and more preferably at least 3.5 degrees per minute. The melting and vaporization temperatures of the thermally conductive material are generally not suitable measurement points, as the temperature of the thermally conductive material will change very little, if at all, during the phase change. The same temperature measurement points preferably are used in connection with the original tubing segment and the second tubing segment, as otherwise normalization of one set of data relative to the other may be necessary. Also, it is preferable to use the same heating and/or cooling mediums for measurements made before and after alteration of the tubing segment, in order to avoid having to normalize one set of data relative to the other. Furthermore, use of a generally constant-temperature heating or cooling medium is preferred in order to avoid having to take into account changes in the temperature of the medium, and differences in volume of the medium used for time measurements of tubing segments having different conductivities.

It has been found useful in practice to make time measurements between one pair of temperatures, e.g., $T_1$ and $T_2$ during heating of the thermally conductive material, and another pair of temperatures, e.g., $T_5$ and $T_6$, during cooling of the thermally conductive material, as the temperatures at which the rate of change in temperature of the thermally conductive material is highest can be different during thermally conductive material heating and cooling processes. When Cerrobend ® alloy is used, useful temperature measurement points when the thermally conductive material is heated are about 155° F. and 170° F. During a corresponding cooling process, useful temperature measurement points are 160° F. and 147° F.

The method of the present invention can be carried out under boiling conditions, preferably using water as a cooling medium and using a hot oven as a heating medium. When measurement of changes in heat transfer rates at or near the boiling point of water are desired, $T_1$ preferably is greater than 212° F., $T_2$ is greater or less than 212° F., and the tubing segment preferably contains a thermally conductive material that melts at a temperature greater than 212° F. The tubing segment can be heated in an oven to a temperature above 212° F. and subsequently cooled in a bath having a temperature of less than 212° F.

According to one embodiment of the invention, alteration of the heat transfer characteristics of the tubing segment includes any type of change that will impact the overall heat transfer coefficient of the tubing segment and/or the heat transfer area of the tube wall. Preferably, tubing segment alteration constitutes removal of deposits from the wall of the tubing segment, such as by chemical cleaning techniques. While the tubing segment preferably is cleaned on at least the outer surface, the inner surface of the tubing segment also can be cleaned. It is preferable to avoid temporarily removing the thermally conductive material from the tubing segment for purposes of cleaning. Thus, in situations in which the outer surface of the tubing segment is to be cleaned, the thermally conductive material preferably is placed inside the tube. Conversely, when the inner surface of the tubing segment is to be cleaned, the thermally conductive material preferably contacts the outer side of the tube.

In practicing the method of the invention, time measurements which are accurate to at least the nearest second usually will provide for a useful comparison of heat transfer rates before and after cleaning of the tube walls. The times that are measured are inversely proportional to the overall rate at which heat is conducted from the medium surrounding the tube, through the tube wall and into the thermally conductive material, or in the opposite direction.

The time measurements obtained before and after alteration of the segment can be compared qualitatively and/or quantitatively in a variety of ways. In this connection, the percentage change in heat transfer rate due to chemical cleaning can be calculated by taking the difference between the heat transfer times before and after chemical cleaning as measured under identical conditions, dividing this difference by the heat transfer time before alteration of the tubing segment, and multiplying the result by 100.

Having generally described the invention, the following examples are included for purposes of illustration so that the invention may be more readily understood and are in no way intended to limit the scope of the invention, unless otherwise specifically indicated.

EXAMPLE 1

Filling of Tubing Segment; Selection of Temperature Measurement Points

A straight segment of Inconel 600 (International Nickel Company) tubing having an outer diameter of ⅜", and a mass of 450.04 g was obtained. One end of the tube was sealed with a Swagelok ® tube fitting (Crawford Fitting Co.) end cap through which a thermocouple was wired. The tip of the thermocouple was bent to an S-shape with the tip of the thermocouple firmly located in the center of the tube. The sealed end of the tube was placed in a hot water bath having a temperature of 200±5° F. About 40% of the tube was immersed in the hot water bath. Cerrobend ® (Cerro Metal Products Co., Bellefonte, Pa.) alloy was heated to above 210° F. and was poured into the tilted tube. The upper end of the tube was sealed, and the tube was heated in the hot water bath in a generally vertical position until the thermocouple indicated that the thermally conductive material was at a temperature of 180° F. This heating process took about ten minutes. The tube was then lifted vertically from the bath and was air cooled at room temperature, thereby allowing a void to form at the top and allowing air bubbles to be removed from the melt. The tube was opened and a ¾" void was observed at the upper end of the tube. This void space was desirable in order to allow for expansion or contraction of the Cerrobend ® material.

The tubing segment was then transferred repeatedly from a hot bath having a temperature of 190°–200° F. to a cooler bath having a temperature of about 149° F., and measurements of the time required for the temperature of the thermally conductive material to change from 155° F. to 151° F. and from 155° F. to 150° F. were made. The following day, similar measurements were made as the tubing segment was alternately heated from 150° F. to 175° F. in a constant temperature hot bath at 192.2° F. and cooled to room temperature. It was found that repeated measurements of heating time between 150° F. and 175° F. were consistent. Repeated measurements of cooling time lacked consistency, and it was concluded that the inconsistency was a result of subcooling during crystallization of the Cerrobend ® material. It was further concluded that the most accurate results can be obtained when the temperature measurement points are temperatures at which the slope of the temperature-versus-time curve is steepest. The temperature-versus-time curve is relatively flat during a phase change.

EXAMPLE 2

Measurement of Time Required for Temperature Change of Thermally Conductive Material Before Cleaning A U-tube 10, shown in FIG. 1, having a 5" radius of curvature was obtained. A wire thermocouple 12 was inserted in the tube, with the temperature-sensing end of the thermocouple extending to the bottom of the curve of the U. The thermocouple 12 was bent into an S-shaped curve in order to keep the temperature-sensing end away from the tube wall. The tube 10 was filled to within ½" of each end with melted Cerrobend ® alloy having a temperature of about 210° F. The tube was sealed. Wires 14 were affixed to each end of the tube and were connected to a horizontal immersion control rod 16. The thermocouple 12 was clamped to the rod to prevent the U-tube 10 from swinging from the wires 14.

A Primeline Stripchart Recorder #EL195 (Esterline Corp.) (not shown) was calibrated and loaded with chart paper. A first water bath 18 was prepared and kept at a constant temperature of 144.2° F., and an agitator 20 was arranged to heavily agitate the bath. A thermocouple 22 was placed in the bath to continually monitor its temperature. A second water bath was prepared and kept at a constant temperature of about 186.5° F. with an agitator set for minimum agitation.

The tube was placed in the first constant-temperature bath overnight in order to ensure that it reached equilibrium with the bath. The next day, the tube was placed in the second bath for about 15 minutes in order to melt the Cerrobend ®, and was subsequently cooled in the first bath for 5.0 minutes. Temperature measurement points were selected at which the rate of change in temperature of the thermally conductive material was found to be high when it was subjected experimentally to heating processes and cooling processes, i.e. 155° F. and 170° F. were selected for the heating process and 160° F. and 147° F. were selected for the cooling process. Temperature measurements were then taken as the tubing segment was repeatedly heated in the second bath from 155° F. to 170° F. and subsequently cooled in the first bath from 160° F. to 147° F. The tubing segment remained in each bath for 5 minutes before being transferred to the other bath. The heating and cooling time in seconds for each measured temperature range are provided on Tables 1 and 2 below, along with average times for the heating and cooling processes.

Differences in the times required for heating the thermally conductive material and the times required for cooling the material were attributed to both the difference in ΔT for the heating and cooling processes, and to the differences in the conductive properties of liquid metal and solid metal in the tube.

EXAMPLE 3

Measurement of Time Required for Temperature Change of Thermally Conductive Material After Cleaning The U-shaped tube used in Example 2 was cleaned on a polishing wheel to remove the magnetite coating from its outer surface, and was buffed with a moist cloth. The tests conducted in Example 2 were then repeated, using the same constant-temperature water baths, temperature measurement points and Stripchart Recorder. The temperature of the first bath was maintained at 144.2° F. The temperature of the second bath was maintained at 186.6° F.

Before time measurements were taken, the tube was warmed in the first bath for about 90 minutes and was then placed in the second bath for about 15 minutes in order to melt the Cerrobend ®. The tubing segment was subsequently cooled in the first bath for five minutes.

The measurements of temperature and time collected are shown on Tables 1 and 2 below. Calculations of the percent decrease in heat transfer time based both on (1) total average times, and (2) average times with the highest and lowest data points excluded, are also provided.

As indicated in Tables 1 and 2, the percent decrease in heat-transfer time due to the chemical cleaning of the tube used in Examples 2-3 was between 5 and 6%, indicating that it would be economically beneficial to clean the steam generator tubes. Furthermore, in a power-limiting situation, cleaning the tubes could result in a 5-6% increase in power generation. Similar results were obtained for measurement taken of heating and cooling processes.

As will be apparent to persons skilled in the art, various modifications and adaptations of the structure above described will become readily apparent without departure from the spirit and scope of the invention, the scope of which is defined in the appended claims.

TABLE 1

HEAT TRANSFER TIME FOR TEMPERATURE INCREASE OF U-SHAPED HEAT EXCHANGER TUBE

| Test Number | Heating Time 155-170° F. |
|---|---|
| Heat Transfer Time Before Cleaning | |
| 1 | 114 |
| 2 | 116 |
| 3 | 117 |
| 4 | 122 |
| 5 | 117.5 |
| 6 | 117 |
| 7 | 115.5 |
| 8 | 116 |
| 9 | 119 |
| 10 | 118 |
| 11 | 118 |
| 12 | 116 |
| 13 | 118.5 |
| AVG | 117.3 |
| AVG w/o HI/LO | 117.1 |
| Heat Transfer Time After Cleaning | |
| 14 | 111.5 |
| 15 | 109 |
| 16 | 110 |
| 17 | 111 |
| 18 | 107 |
| 19 | 113 |
| 20 | 111 |
| 21 | 114 |
| 22 | 108 |
| 23 | 109.5 |
| 24 | 106 |
| 25 | 112 |
| 26 | 113 |
| 27 | 111 |
| 28 | 117 |
| AVG | 110.9 |
| AVG w/o HI/LO | 110.8 |
| Decrease in Heat Transfer Time | |
| AVG | 5.5 |
| AVG w/o HI/LO | 5.4 |

TABLE 2

HEAT TRANSFER TIME FOR TEMPERATURE DECREASE OF U-SHAPED HEAT EXCHANGER TUBE

| Test Number | Cooling Time 160-147° F. |
|---|---|
| Heat Transfer Time Before Cleaning | |
| 1 | 187 |
| 2 | 181 |
| 3 | 193 |
| 4 | 184 |
| 5 | 181 |
| 6 | 192 |
| 7 | 183 |
| 8 | 184 |
| 9 | 183.5 |
| 10 | 181 |
| 11 | 186 |
| 12 | 184 |
| 13 | 179.5 |
| AVG | 184.5 |
| AVG w/o HI/LO | 184.2 |

TABLE 2-continued

HEAT TRANSFER TIME FOR TEMPERATURE DECREASE OF U-SHAPED HEAT EXCHANGER TUBE

| Test Number | Cooling Time 160-147° F. |
|---|---|
| Heat Transfer Time After Cleaning | |
| 14 | 175 |
| 15 | 175 |
| 16 | 176 |
| 17 | 175.5 |
| 18 | 178 |
| 19 | 171 |
| 20 | 173.5 |
| 21 | 172 |
| 22 | 176 |
| 23 | 181 |
| 24 | 167 |
| 25 | 178 |
| 26 | 174 |
| 27 | 172 |
| 28 | 177 |
| AVG | 174.7 |
| AVG w/o HI/LO | 174.8 |
| Decrease in Heat Transfer Time | |
| AVG | 5.3 |
| AVG w/o HI/LO | 5.1 |

What is claimed is:

1. A method of determining differences in the rate of heat transfer through first and second tube walls, comprising:
    (a) obtaining a tubing segment having a first wall, the first wall including an inner surface defining an inner side of the tubing segment and a radially spaced outer surface defining an outer side of the tubing segment,
    (b) supporting a quantity of thermally conductive material on one of the inner side and the outer side of the tubing segment having a first wall, the thermally conductive material being in thermal contact with the first wall,
    (c) placing one of a heating medium and a cooling medium having an initial temperature $T_a$ on the other of the inner side and the outer side of the tubing segment in thermal contact with the first wall, and determining the time required for the temperature of a portion of the thermally conductive material in thermal contact with the first wall to change from a first temperature $T_1$ to a second temperature $T_2$, $T_1$ and $T_2$ being outside the melting range and vaporization range of the thermally conductive material,
    (d) obtaining a tubing segment having a second wall, the second wall including an inner surface defining an inner side of the tubing segment and a radially spaced outer surface defining an outer side of the tubing segment,
    (e) supporting a quantity of thermally conductive material on one of the inner side and outer side of the tubing segment having a second wall, the thermally conductive material being in thermal contact with the second wall,
    (f) placing one of a heating medium and a cooling medium having an initial temperature $T_b$ on the other of the inner side and outer side of the tubing segment in thermal contact with the second wall, and determining the time required for the temperature of a predetermined portion of the thermally conductive material in thermal contact with the second wall to change from a third temperature $T_3$ to a fourth temperature $T_4$, $T_3$ and $T_4$ being outside the melting range and vaporization range of the thermally conductive material, $T_3$ being greater than $T_4$ when $T_1 > T_2$ and $T_3$ being less than $T_4$ when $T_1 < T_2$, and
    (g) comparing the times obtained in steps (b) and (f).

2. The method of claim 1, wherein the tubing segment having a second wall is obtained by altering the physical characteristics of the tubing segment having a first wall.

3. The method of claim 2, wherein altering the physical characteristics of the tubing segment having a first wall includes cleaning at least one of the inner surface and outer surface of the tubing segment having a first wall.

4. The method of claim 1, wherein the tubing segment having a first wall is obtained from a heat exchanger after use.

5. The method of claim 1, wherein $T_1 = T_3$ and $T_2 = T_4$.

6. The method of claim 1, wherein $T_a = T_b$.

7. The method of claim 1, wherein the medium having a temperature $T_a$ and the medium having a temperature $T_b$ are kept at constant temperatures when time measurements are made.

8. The method of claim 7, wherein $T_1 = T_3$, $T_2 = T_4$ and $T_a = T_b$.

9. The method of claim 1, wherein the mediums having temperatures $T_a$ and $T_b$ are baths containing water.

10. The method of claim 1, wherein steps (c) and (f) are conducted repeatedly and average values of time are calculated for each step.

11. The method of claim 1, wherein the quantity of thermally conductive material in thermal contact with the first wall has the same conductivity and composition as the quantity of thermally conductive material in contact with the second wall.

12. The method of claim 11, wherein the thermally conductive material has a higher thermal conductivity than the first and second walls.

13. The method of claim 11, wherein the thermally conductive material is an alloy comprising lead and bismuth.

14. A method according to claim 1, wherein at least one of the inner surface and outer surface of the tubing segment having a first wall is radioactive.

15. A method according to claim 1, further comprising the step of determining the percent difference in the rate of heat transfer through the tubing segment having a first wall and the tubing segment having a second wall, taking into account any differences between $T_1$ and $T_3$, $T_2$ and $T_4$, and the mediums having the temperatures $T_a$ and $T_b$, and taking into account any changes in $T_a$ and $T_b$ during the measurement process.

16. The method of claim 1, further comprising:
    (h) after step (c), removing the medium having an initial temperature $T_a$ from thermal contact with the first wall, placing one of a heating medium and a cooling medium having an initial temperature $T_c$ on the other of the inner side and the outer side of the tubing segment in thermal contact with the first wall, and determining the time required for the temperature of the portion of the thermally conductive material in thermal contact with the first wall to change from a fifth temperature $T_5$ to a sixth temperature $T_6$, $T_5$ being greater than $T_6$ when $T_1 < T_2$ and $T_5$ being less than $T_6$ when $T_1 > T_2$, (i) after step (f), removing the medium having an initial temperature $T_b$ from thermal contact with the second wall, placing one of a heating medium and a cooling medium having an initial temperature $T_d$ on the other of the inner side and the outer side of the tubing segment in contact with the second wall, and determining the time required for the temperature of the portion of the thermally conductive material in thermal contact with the second wall to change from a seventh temperature $T_7$ to an eighth temperature $T_8$, $T_7$ being greater than $T_8$ when $T_3 < T_4$, and $T_7$ being less than $T_8$ when $T_3 > T_4$, and (j) comparing the times obtained in steps (h) and (i).

17. The method of claim 16, wherein $T_a = T_b$, $T_c = T_d$, $T_1 = T_3$, $T_2 = T_4$, $T_5 = T_7$ and $T_6 = T_8$.

18. The method of claim 16, wherein steps (c), (f), (h) and (i) are conducted repeatedly and average values of time are calculated.

19. A method of determining a change in the rate of heat transfer through the wall of a heat exchanger tube due to fouling of the surface of the tube, comprising the steps of:

(a) removing a segment of fouled tubing from a heat exchanger, the tubing segment having a first wall including an inner surface and a radially spaced outer surface, (b) supporting a quantity of a thermally conductive material in contact with one of the inner surface and the outer surface of the first wall, (c) placing one of a heating medium and a cooling medium having a constant temperature $T_a$ in contact with the other of the inner surface and the outer surface of the first wall, and subsequently determining the time required for the temperature of a predetermined portion of the thermally conductive material to change from a first temperature $T_1$ to a second temperature $T_2$, $T_1$ and $T_2$ being outside the melting range and vaporization range of the thermally conductive material, (d) obtaining a substantially clean segment of heat exchanger tubing having a second wall including an inner surface and an outer surface, (e) supporting a quantity of the thermally conductive material in contact with one of the inner surface and the outer surface of the second wall, (f) placing the medium used in step (c) in contact with the other of the inner wall and the outer wall of the tubing segment and determining the time required for the temperature of the thermally conductive material to change from $T_1$ to $T_2$, and (g) comparing the times obtained in steps (c) and (f).

* * * * *